United States Patent
Guillon et al.

(10) Patent No.: US 6,782,123 B1
(45) Date of Patent: Aug. 24, 2004

(54) METHOD AND DEVICE FOR MAPPING RADIATION SOURCES

(75) Inventors: François Guillon, Montigny le Bretonneux (FR); Philippe Baussart, Mandelieu la Napoule (FR); Thomas Dalancon, Garancieres (FR)

(73) Assignee: Compagnie Generale des Matieres Nucleaires, Velizy-Villacoublay (FR)

( * ) Notice: Subject to any disclaimer, the term of this patent is extended or adjusted under 35 U.S.C. 154(b) by 0 days.

(21) Appl. No.: 09/355,956
(22) PCT Filed: Feb. 16, 1998
(86) PCT No.: PCT/FR98/00293
§ 371 (c)(1),
(2), (4) Date: Dec. 14, 1999
(87) PCT Pub. No.: WO98/36321
PCT Pub. Date: Aug. 20, 1998

(30) Foreign Application Priority Data

Feb. 17, 1997 (FR) .............................................. 97 01809

(51) Int. Cl.⁷ .......................... G06K 9/00; H04N 13/00; G01J 5/00; G01T 1/00; G01T 1/29; G03C 9/00
(52) U.S. Cl. .......................... 382/154; 348/42; 348/47; 250/336.1; 378/41
(58) Field of Search .................. 382/154; 250/336.01, 250/393, 363.01, 366; 348/42, 46–48; 600/407, 436; 374/4; 378/41

(56) References Cited

U.S. PATENT DOCUMENTS

| | | | | | |
|---|---|---|---|---|---|
| 4,172,226 A | * | 10/1979 | Rubin | ........................ | 250/394 |
| 4,727,565 A | * | 2/1988 | Ericson | ....................... | 378/163 |
| 4,791,300 A | * | 12/1988 | Yin | ....................... | 250/363.01 |
| 5,197,476 A | * | 3/1993 | Nowacki et al. | ............ | 600/439 |
| 5,227,969 A | * | 7/1993 | Waggener et al. | .......... | 600/407 |
| 5,349,378 A | * | 9/1994 | Maali | .......................... | 348/46 |
| 5,638,461 A | * | 6/1997 | Fridge | ........................ | 382/154 |
| 5,680,474 A | * | 10/1997 | Iijima et al. | ................. | 382/154 |
| 5,699,444 A | * | 12/1997 | Palm | .......................... | 382/154 |
| 5,930,383 A | * | 7/1999 | Netzer | ........................ | 382/154 |
| 6,080,989 A | * | 6/2000 | Royle et al. | ................. | 250/366 |
| 6,483,948 B1 | * | 11/2002 | Spink et al. | ................. | 382/255 |

FOREIGN PATENT DOCUMENTS

WO     WO 9701769 A1  *  1/1997  ............. G01T/7/00

* cited by examiner

Primary Examiner—Jingge Wu
Assistant Examiner—Ryan J. Hesseltine
(74) Attorney, Agent, or Firm—Oblon, Spivak, McClelland, Maier & Neustadt, P.C.

(57) ABSTRACT

A method and apparatus for precisely locating radioactive sources. A pair of visual cameras are oriented in directions so that they have all or part of their field of vision in common. The apparatus also includes an intermediate camera which is sensitive to the radiation to be measured. The visual cameras make it possible to define the position of the details of the environment by a triangulation method and another triangulation is carried out in order to know the position of the sources after having moved the apparatus. Photogrammetry software is used to accomplish these tasks easily.

9 Claims, 8 Drawing Sheets

METHOD AND DEVICE FOR MAPPING RADIATION SOURCES

BACKGROUND OF THE INVENTION

1. Field of the Invention

The invention concerns a method and device for mapping radiation sources, to make it possible to locate such sources in a three-dimensional environment which may be known or unknown at the start.

2. Discussion of the Background

The idea of detecting radiation sources such as radioactive leaks by comparing an image of these sources, taken by a specialised item of equipment, and a visual or video image of the environment taken by an ordinary light-sensitive camera has already been applied. The use of the images can be effected empirically by the user, finding the locations of the radioactive sources on the visual image; in a rudimentary design of the method, he identifies the elements of the environment, restored on the visual image, which correspond to the places on the image of the sources on which a source has been recorded. The identification of the position of the sources is however not very precise and calls on the judgement and knowledge of the user with regard to the environment: he may thus know in advance the places in the environment where a leakage is liable to occur and identify them easily when it arises. Though such a method is sufficient in certain situations, it does not lend itself to automatic processing, notably if repair work is to be entrusted to a robot, which must know precisely the position of the source in three-dimensional space in order to reach it.

In a more improved method which is described in French patent No 2 652 909, a camera is used which is combined with obturators and means of converting the radioactive radiation, which enables it to record in turn a visual image and a radioactive emission image of the environment. The two images are supplied to automatic processing means, which superimpose them, which gives, without error, the position of the sources in the field of the camera. However, as this work is carried out on a two-dimensional image, the problem mentioned above is not resolved: an automatic use system cannot determine the distance of the source, and if it is indeed at the position of a detail of the environment on which it is superimposed, or if it is situated in front of or behind it on the radius of sight of the camera.

In addition, tomography methods are known which make it possible to know the positions of radioactive sources in a three-dimensional environment; the cameras (or, more generally, the means of taking two-dimensional images) are moved around the object and the information read on the images is combined in order to derive therefrom the position of the sources. This amounts to inverting, directly or indirectly, a system of equations expressing the fact that the radiation received by each image point is the sum of the radiation emitted along the line of projection or sight of the camera which ends at this point. However, it is necessary to know the position of the camera each time an image is taken, which is not always possible in the situations envisaged here, since the robots are not always sufficiently precise, nor even provided with position coders which indicate where they have arrived.

Finally, it is necessary to cite the international patent application WO 96/20421, which describes a double method of tomography and superimposition of two three-dimensional images thus obtained, where one illustrates the visible details of the object examined and the other depicts a view of the object by X-ray or the like. However, the two images are calculated in the same way and separately (except in order to apply correction calculations for the effects of the distortion, enlargement, etc produced by each of the photographic means); they are put in a relationship of equality and have the same importance.

This patent therefore does not give the idea of using a visual image of the environment in order to assist in determining the positions of point radiation sources in this environment, without it being necessary to have recourse to the conditions of obtaining tomographic images.

SUMMARY OF THE INVENTION

The object of the invention is therefore to make it possible to completely and precisely locate radiation sources, radioactive or others, in a three-dimensional environment.

The essential idea of the invention is that a three-dimensional model of the environment is used, established in advance by taking visual images, on which there are placed the sources registered on other images, which are correlated with the visual images.

The purpose of the model is therefore not only to provide a graphical representation of the positions of the sources in the environment, but particularly to help to determine these positions.

In its most general form, the invention thus concerns a method for the three-dimensional mapping of sources of radiation in an environment, comprising a first taking of a visual image of the environment and a first taking of an image of the sources, characterised in that it comprises a second taking of a visual image of the environment and a second taking of an image of the sources; an establishment of a visual three-dimensional model of the environment by searching for and identification of analogous elements of the visual image and then by location calculations for the homologous elements of the visual images; a location in the model of the environment of projection lines leading from the sources to the images of the sources; and calculations of positions of points of intersection of the projection lines in the model.

A device for implementing this method comprises a device for taking images of the radiation, a pair of means of taking visual images of an environment of the radiation sources, the means of taking visual images being oriented in directions such that they have all or part of their field of vision in common and mounted on a rigid common support which is non-deformable but adjustable with the means of taking images of the radiation, and photogrammetry means able to reconstitute a visual three-dimensional model of the environment from the visual images and to superimpose a three-dimensional model of the radiation sources using images of the radiation on the visual model.

BRIEF DESCRIPTION OF THE DRAWINGS

The commentary on concrete embodiments of the invention, given for purposes of illustration and applied to the detection of gamma radiation sources, will now be developed by means of the following figures.

DETAILED DESCRIPTION OF THE PREFERRED EMBODIMENTS

Figure 1:
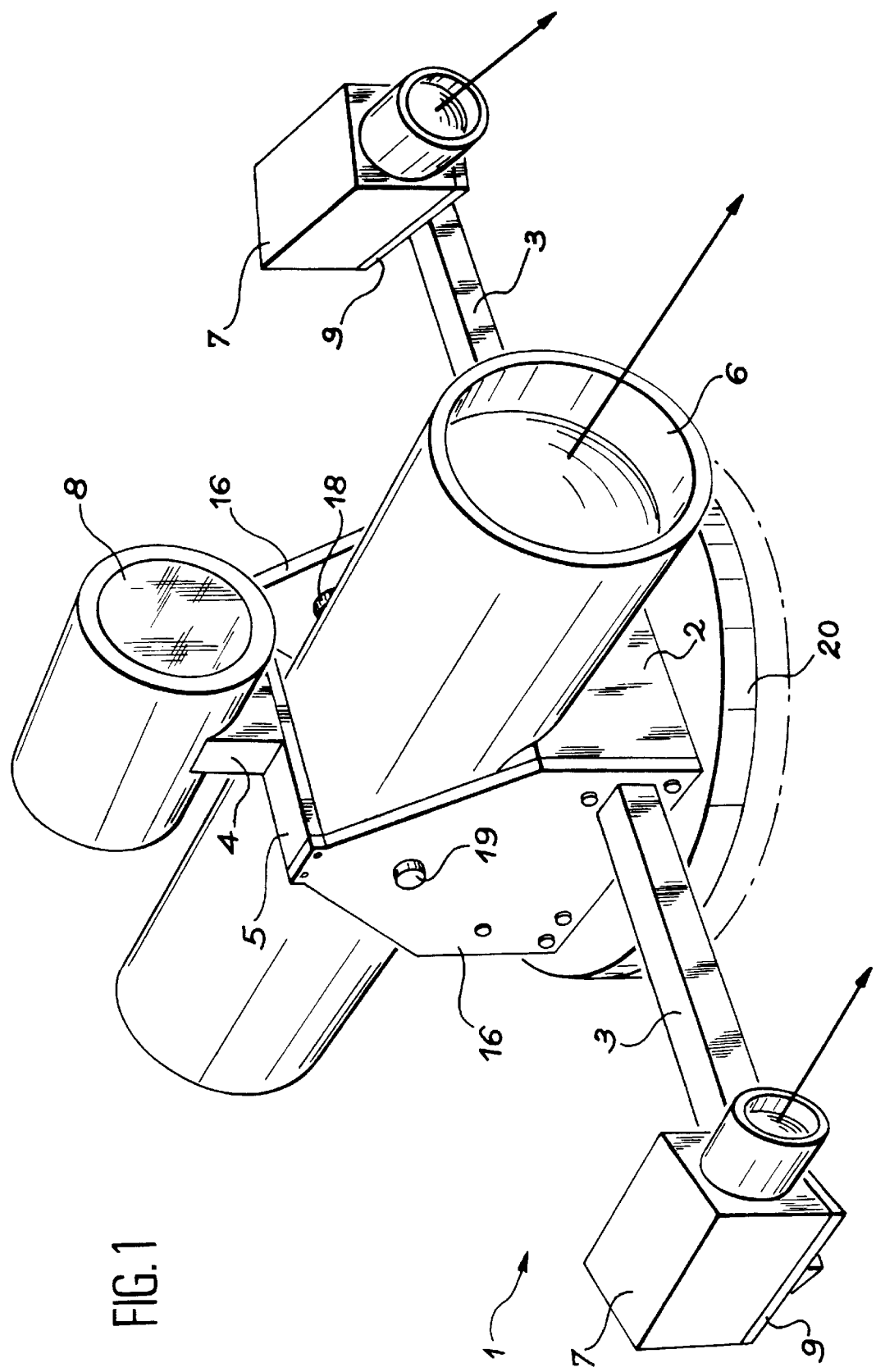
FIG. 1 is a general view of the mechanical means of the device.

Reference is now made to the figures. The first shows the general appearance of the device of the invention: a frame 1 comprises a central housing 2 from which there start two lateral arms 3 pointing in opposite directions and an upper appendage 4. The central housing 2 contains an alveolus, open towards the front, intended to house a gamma camera 6. Video cameras 7 are mounted at the ends of the lateral arms 3. Finally, a spotlight 8 is mounted at the top of the upper appendage 4.

Figure 2:
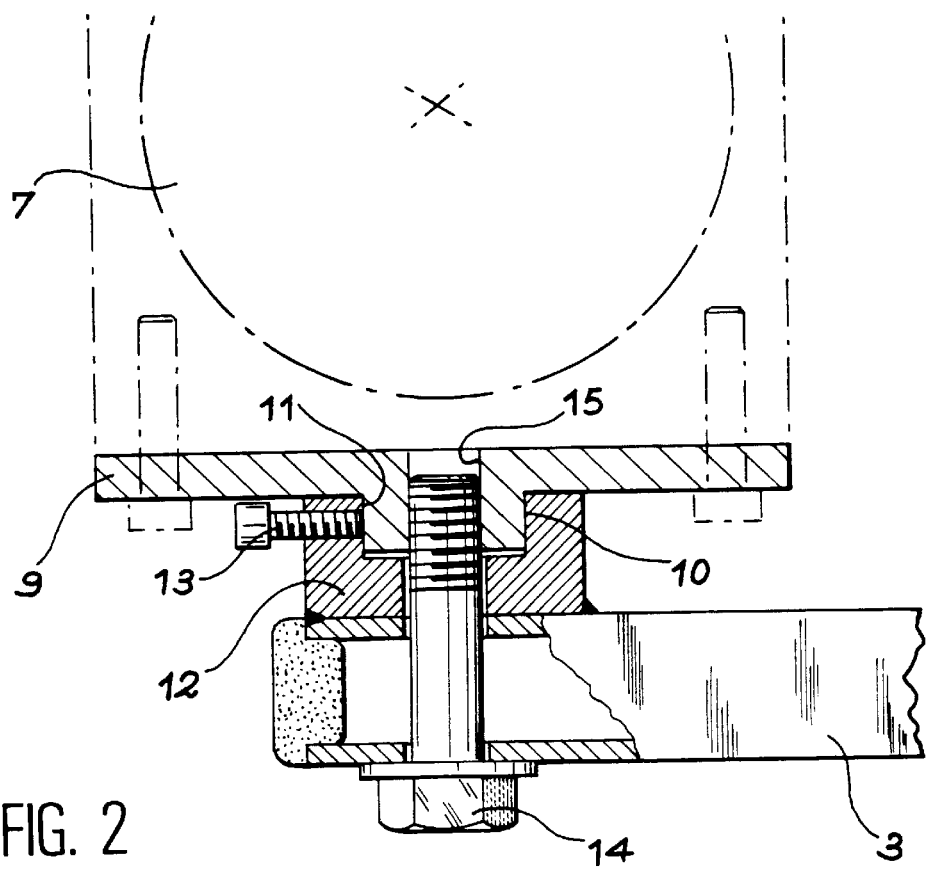
FIGS. 2 and 3 are two details of the device.

The video cameras 7 are screwed onto rotating plates 9, each terminating (see FIG. 2) in a bottom journal 10 engaged in a cup 11 in a ring 12 welded to the end of the associated arm 3. The ring 12 receives a lateral locking screw 13, the end of which emerges in the cup 11 and clamps the lower journal 10, holding it in place at the required orientation. Finally, a fixing screw 14 is engaged in a thread 15 in the plate 9 coaxial with the lower journal 10, and this screw 14 passes through the lateral arm 3 and the ring 12 and holds the assembly clamped. This arrangement makes it possible, as will be seen immediately, to orient the video cameras 7 as required in the same plane with respect to azimuth in order to give them the desired angle of convergence.

Figure 3:
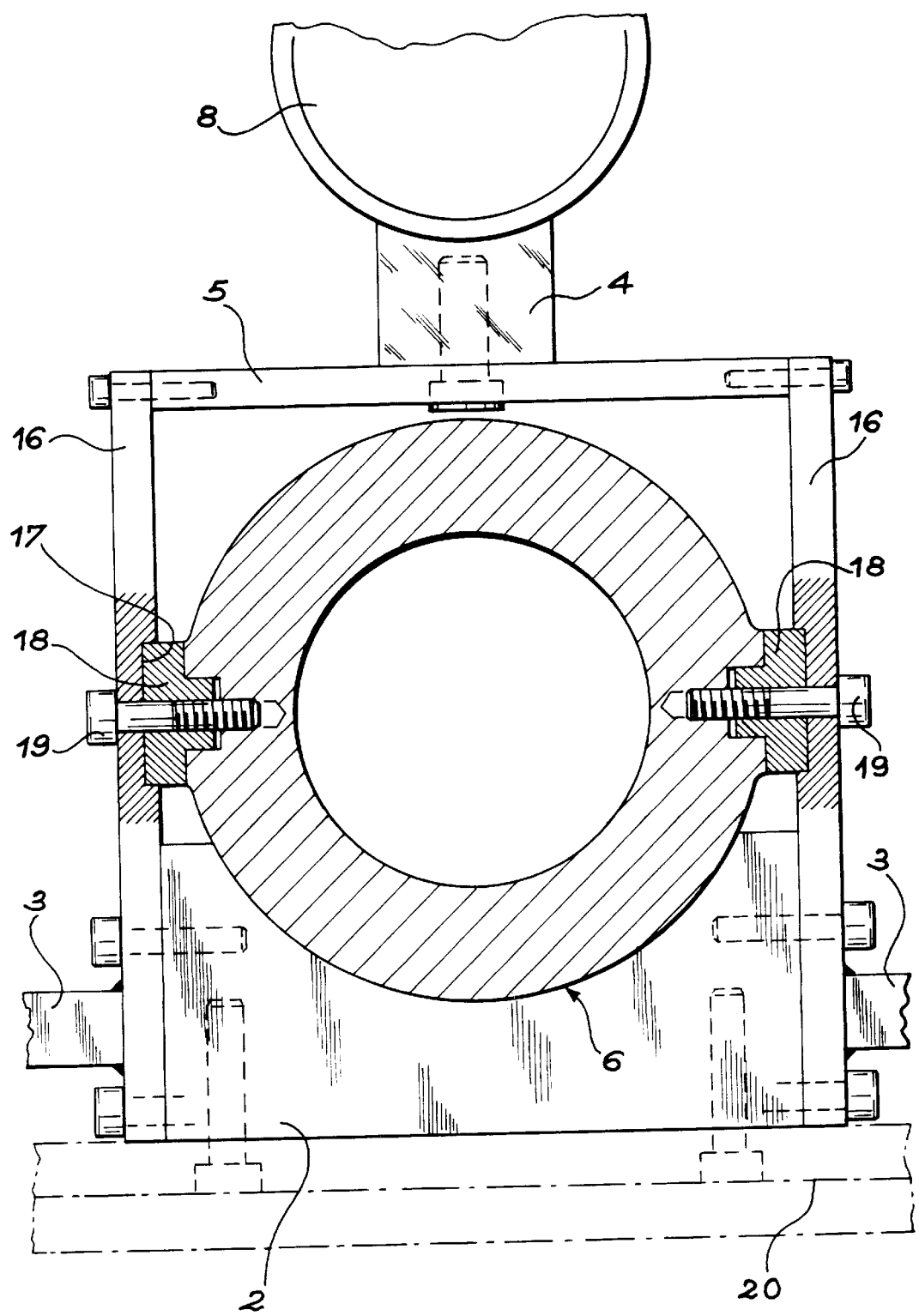

The central housing 2 essentially comprises (see FIGS. 1 and 3) two opposite lateral walls 16 provided with a recess 17 for receiving a journal 18 supporting the gamma camera 6. The screws 19 are engaged through the lateral walls 16 and journals 18 and screwed into the gamma camera 6 in order to clamp it in the required position: it is in fact possible to cause it to rotate about a horizontal axis defined by the journals 18 when the screws 19 are loosened and therefore to adjust its orientation with respect to elevation. The frame 1 is mounted on a base 20 which can be designed to rotate and which is fixed to a support, not shown, robot arm or the like according to the application.

Figure 4:
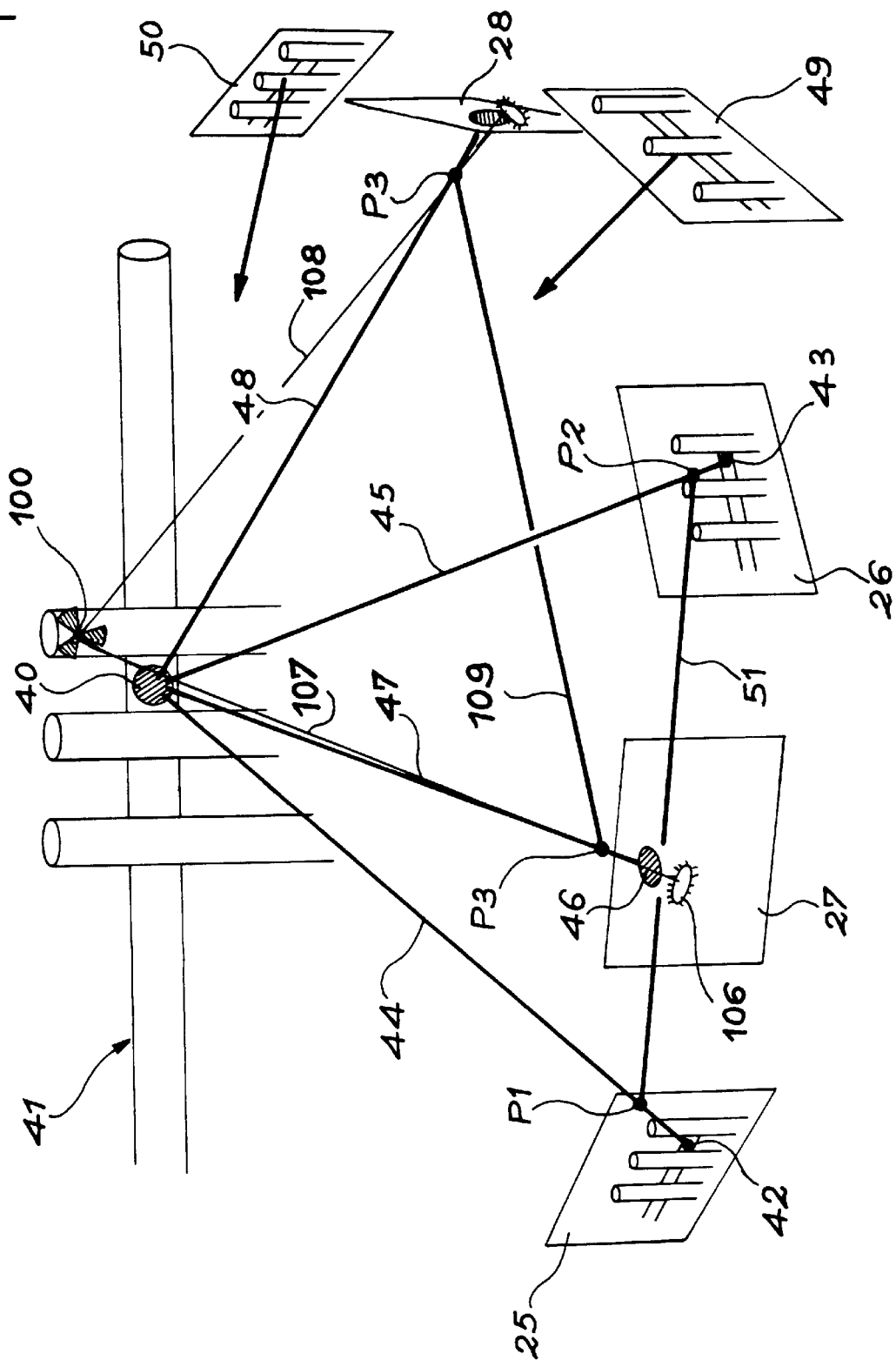
FIG. 4 illustrates the mapping method.

The method of locating radioactive sources can be described fairly simply by means of FIG. 4: the device, brought to a suitable distance from the environment to be explored, takes a first series of images thereof by means of the video cameras 7 and gamma camera 6 without moving. The two visual images 25 and 26 of the environment thus obtained depict substantially the same subject at different angles of view using the video cameras 7. An automatic comparison of these visual images 25 26 consisting of identifying and comparing the homologous points of the images, representing the same noteworthy detail of the environment, makes it possible to deduce the position of the points in the environment with respect to the device, including their distance. The environment can therefore be modelled in three dimensions and the position of the device in the environment determined. Seeking the homologous points on the two visual images 25 and 26 is carried out by one of the specialist software packets which are now available commercially.

There are even software packages capable of directly distinguishing complete details on an image, by recognition of shape associated with a correlation of images, and finding them on an analogous image.

When a pair of homologous points is identified on the visual images 25 and 26, two lines are derived therefrom, ending at the video cameras 7 and through which the real point in the environment is projected onto the visual images 25 and 26. The separation and angle of convergence of the video cameras 7 being known, an elementary triangulation calculation gives the position of intersection of the projection lines, that is to say the position of the point in the environment.

An image 27 of radioactive sources is taken by the gamma camera 6. However, a complete determination of the position of the sources makes it necessary to take another image of sources 28, which is obtained after having moved the device whilst causing it to aim at the same environment, and to compare these two images of sources 27 and 28 in order to assess the difference between the sources and the gamma camera 6.

A more detailed description of the method will now be given.

The work of seeking the position of the points in the visual radioactive environment from the images 25 to 28 is effected by photogrammetry software in conjunction with triangulation calculations, but a preliminary calibration must be undertaken in order to determine the external and internal parameters of the cameras 6 and 7, that is to say their relative positions and orientations on the one hand and their characteristics of restoration of the environment on the images which they produce, on the other hand.

Figure 5:
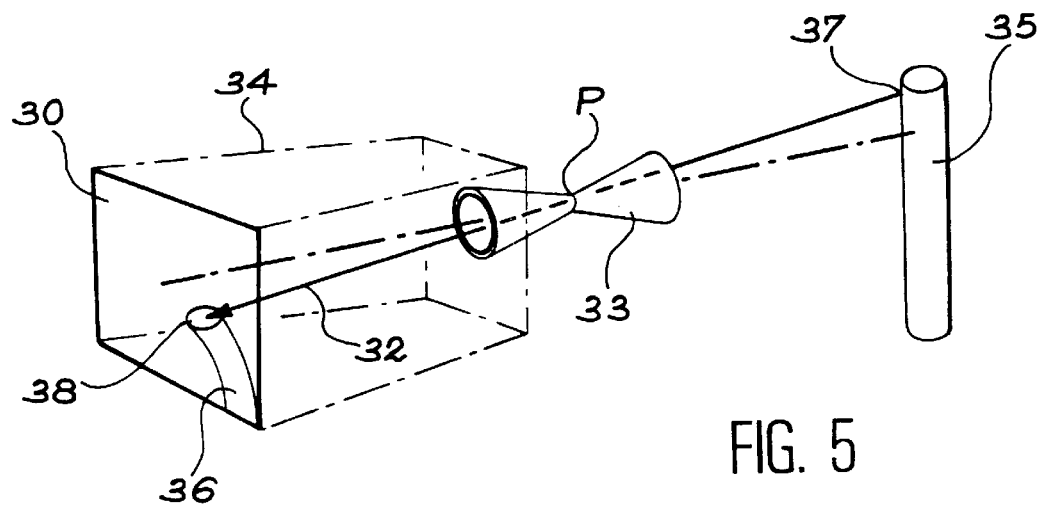
FIG. 5 illustrates the formation of the images.

It is first of all necessary to know the internal parameters. The gamma camera 6 and the video camera 7 can be represented (see FIG. 5) by an image plane 30, on which the image 25, 26, 27 or 28 is taken, and an optical centre P in front of this image plane 30, through which there pass all the radii 32 which impinge on the image plane 30. The optical centre is formed by the diaphragm for the video cameras 7 and by a collimator 33, preceding a pinhole enclosure 34, at the end of which there is situated the image plane 30 for the gamma camera 6.

Figure 6:
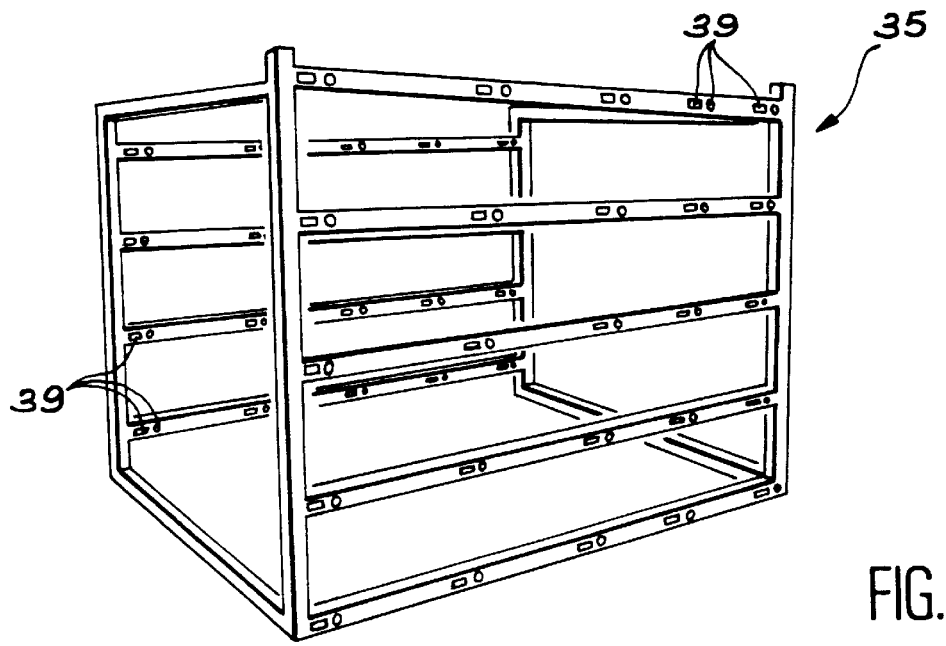
FIG. 6 depicts a calibration sight.

An object 35 at which a camera is aimed appears on its image plane in the form of an object image 36, which may be affected by distortions, but if the object 35 is a sight of a known form and the position of the camera 6 or 7, and in particular of the image plane 30 and of the optical centre P, is calculated with respect to the object 35, it is possible to establish a correspondence between each point 37 of the object 35 and the point 38 by means of which it is represented on the image plane 30, by determining the radius 32 which connects them, and which passes through the optical centre P; this radius 32 can be completely defined by the coordinates of the optical centre and the point 37. The calibration consists precisely of drawing up a look-up table between each point 38 of the image taken by the camera 6 or 7 and the direction of sight (the radius 32) associated with this point and passing through the optical centre P. This table is immutable for given camera settings and serves to determine the directions of the points of unknown objects whose images are then taken. The object 35 of known shape can be the sight illustrated in FIG. 6, composed of a lattice of bars which intersect but which are rather separated from each other and carry points 39 which are identifiable with precision and which enable the photogrammetric software to easily find the noteworthy points in the image and to identify them with respective points on the sight.

It will then be understood, returning to FIG. 4, that any point 40 on an object 41 in an environment which is unknown at the start and aimed at by the two video cameras 7 will appear on the visual images 25 and 26 with the appearance of two points 42 and 43 whose positions on these images will make it possible to derive the directions, on the radii 44 and 45, from the optical centres (denoted here P1 and P2) of the two video cameras 7. The intersection of the radii 44 and 45 is then calculated, which gives the position of the point 40 with respect to the video cameras 7. The generalisation of this method to all the pairs of homologous points on the visual images 25 and 26 makes it possible to find the shape and position of the object 41 in three-dimensional space.

If a point 100 is defined as a source, this appears also on the source image 27 of the gamma camera 6 with the appearance of a point 106. The position of the cameras 6 and 7 with respect to the object makes it possible per se to know the direction of the point 100, which is situated on a radius 107. However, it is not possible to state with certainty that the origin of the point 106 is indeed the point 100 rather than another point on the radius 107. This is why the second source image 28 must be taken in order to give a second radius 108 leading from the new position of the optical centre (P3) of the gamma camera 6 to the point 100, which can then be identified as the source by calculating the intersection of the radii 107 and 108. It is also necessary to know the distance 109 between the two successive positions of the optical centre P3 of the gamma camera 6, that is to say the base of the triangulation undertaken on the radii 107 and 108, in order to determine the position of the point 100 which is their intersection, and the angle of rotation of the device between the two shots. These two items of information can be obtained by a direct measurement of the movements of the device if it is carried by a robot arm whose articulations are provided with movement coders; otherwise, an exploration of the environment and of the object 101 can be recommenced using new visual images 49 and 50 taken by the video cameras 7 at the second position of the device, in order to calculate the latter with respect to the position of the object 41.

The method then comprises a synthesis of the two models of the object 101, which can also be undertaken by the software for seeking and identifying noteworthy homologous points of these models, in order to evaluate their differences in location and orientation compared with the video cameras 7 between the two shooting phases. When this evaluation is completed, it is possible to calculate the positions of the two projection lines 107 and 108 of the source in one of the models, and therefore the position of their point of intersection 100 in this model.

Another variant of the method consists of exploiting a portion of the gamma image 28 which represents the environment 41: the gamma images 28 obtained by the usual gamma cameras are in fact sensitive also to visible light, which means that an image of the environment 41 is superimposed on the image of the sources. This image of the environment is often too tenuous and fuzzy to provide a suitable model of the environment 41 (although exceptions may be envisaged, so that the invention could then be applied with a single camera, the visual images all being able to be superimposed on gamma images), but it can be correlated with the model already obtained by the video cameras 7, by means of the software already mentioned, in order to calculate here also the positions of the lines 107 and 108 of projection of the source in the model.

The method can, in general terms, be implemented with a single visual camera 7, provided that there is available a measurement of the positions of a shot in order to serve as a basis for the triangulations for constructing the model of the visual environment, or other information, a few examples of which are given below.

It is however preferred to apply the invention with the device described in detail, which comprises three cameras in total, since the model of the environment can be constructed much more quickly, without moving the device between two shots and using more effective software for performing the triangulation calculations.

It makes it possible to work "in real time" if for example it is mounted on a robot arm having to manipulate the sources: the position of the sources is then calculated whilst the arm advances, and the two shooting times correspond to two phases of the advance of the arm. There is also the certainty that the two visual images 25, distant from a known base, will be similar and that seeking homologous points will almost always be fruitful.

The rules for determining the external parameters of the device will now be given; this determination is made before using the device according to FIG. 4 and immediately follows the determination, explained above, of the internal parameters of the device; it therefore constitutes a second part of the calibration of the device.

Figure 7:
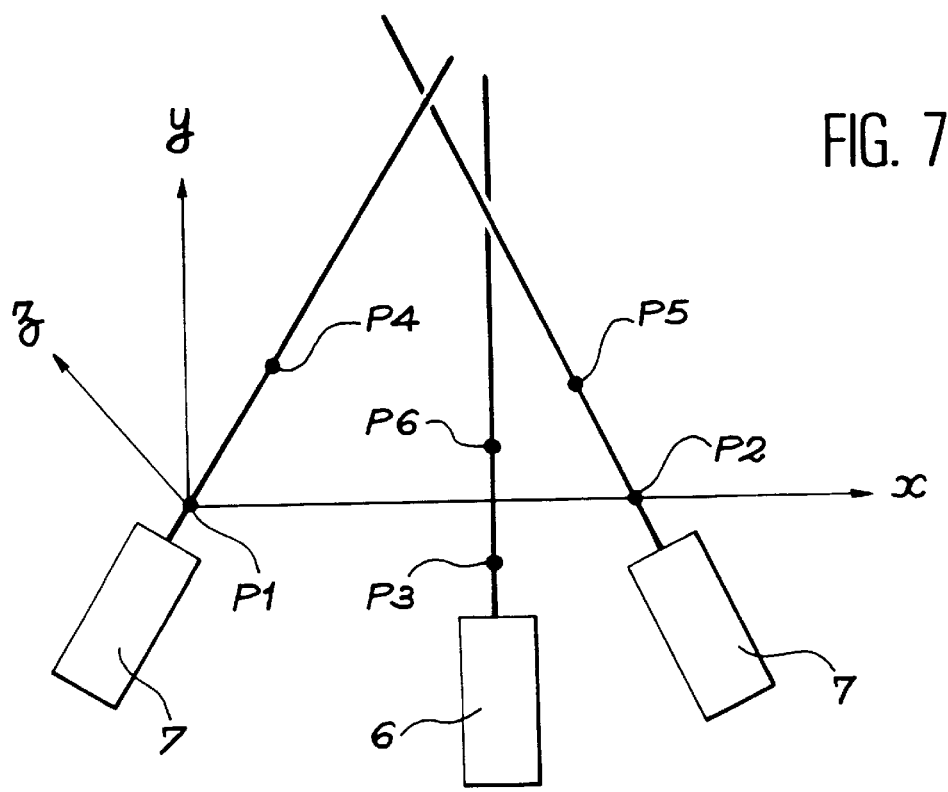
FIG. 7 shows the geometric definition of certain calibration parameters for the device.

The modelling of the object 40, effected on the visual images 25 and 26, also required using a triangulation and therefore knowing a triangulation base, which corresponded to the distance 51 between the video cameras 7. One variant consists of using multiple positions of the device coupled with known length information issuing from a plane or a reference placed in the scene on the one hand, and calculation software for adjusting the beam on the other hand. It was also necessary to know the position of the optical centre P3 of the gamma camera 6 in order to determine the position of the radius 47. These external parameters of the device can be expressed by a file of the coordinates of six points, as shown by FIG. 7: the three optical centres P1, P2 and P3 of the cameras 6 and 7 and three points aligned with these respective optical centres on the central axes of site of the cameras 6 and 7; the latter points are numbered P4, P5 and P6 and can be situated at any distances, identical or not, from the points P1 to P3 with which they are respectively associated. In addition there is no constraint on the relative orientations and positions of the central axes of sight, which can intersect or not, although the axes of the video cameras 7 are supposed to intersect in the embodiment actually proposed; it is thus possible to adjust, without any particular constraint, the positions of the cameras 6 and 7 on the lateral arms 3 and frame 1. The external parameters of the cameras can therefore be summarised in the following table:

| x(P1) | y(P1) | z(P1) |
| x(P2) | y(P2) | z(P2) |
| x(P3) | y(P3) | z(P3) |
| x(P4) | y(P4) | z(P4) |
| x(P5) | y(P5) | z(P5) |
| x(P6) | y(P6) | z(P6) | where x, y and z designate the Cartesian coordinates of the point P under consideration. The reference frame for measuring the coordinates can be chosen as required, for example with the origin P1, the axis x passing through P2 and the central axis of sight P1P4 included in the plane of the axes x and y. Under these circumstances, it is possible to write $x(P1)=y(P1)=z(P1)=y(P2)=z(P2)=z(P4)=0$. These seven constraints fix the seven degrees of freedom of the device, that is to say 3 rotations, three translations and one distance base. All these coordinates can be calculated by calibration triangulations undertaken by causing the device to turn about the sight in FIG. 6 and placing it at different positions in order to take series of shots: the distances of the optical centres P1, P2 and P3 of the cameras 6 and 7 to the sight are then known, and as soon as a noteworthy point on the sight is registered on the images of the cameras 6 and 7, the directions of the radii which connect it to the optical centres P1, P2 and P3 are determined as a function of the look-up table, and finally the relative positions of the optical centres P1, P2 and P3, and then suitable positions for the points P4, P5 and P6. The calculations of the positions of the points P1 to P6 are undertaken from several noteworthy positions of the sight in order to have available more numerous data, whose average is finally taken.

Figure 8:
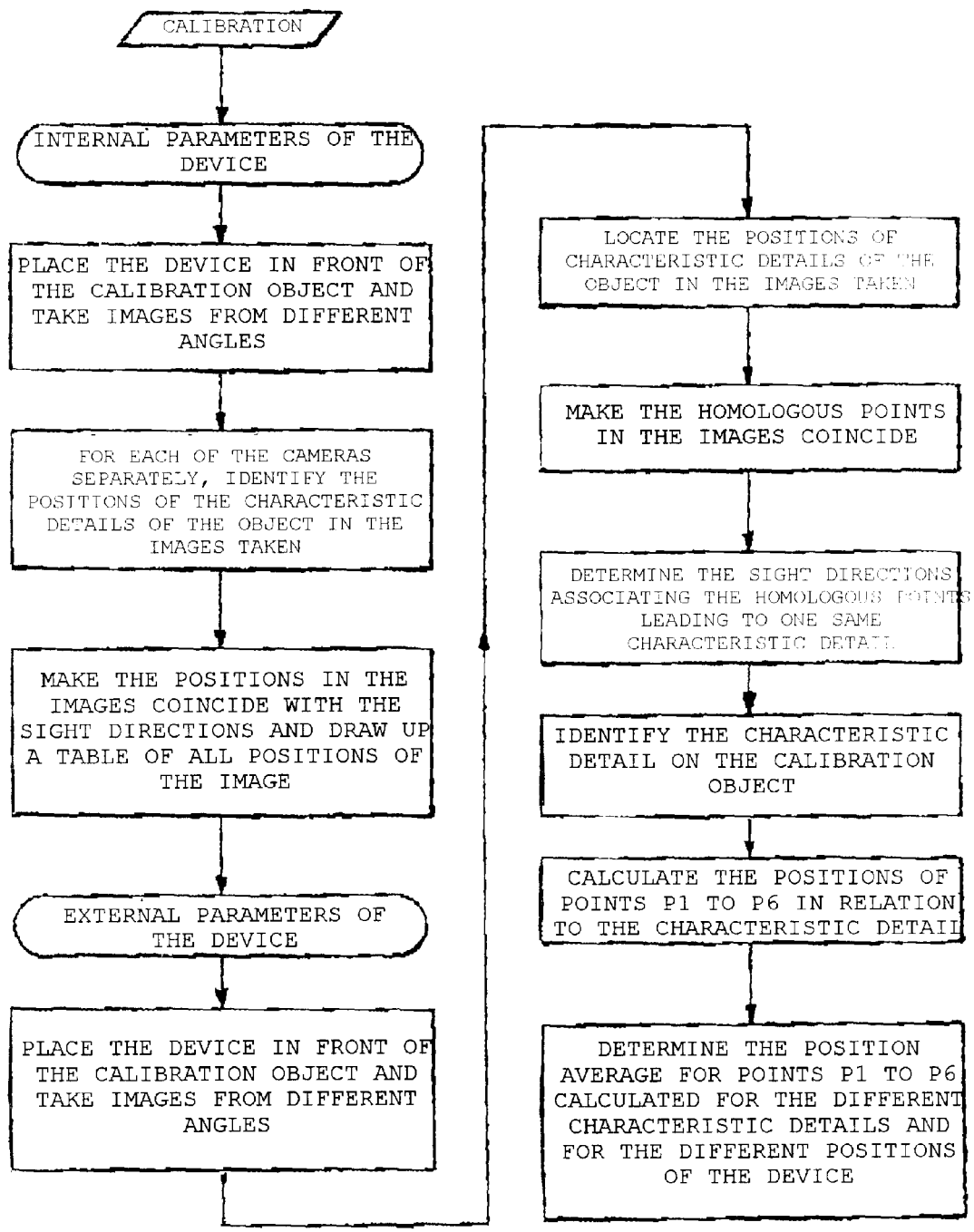
FIGS. 8 and 9 are two flow diagrams setting out the methods of calibrating and servicing the device.
Figure 9:
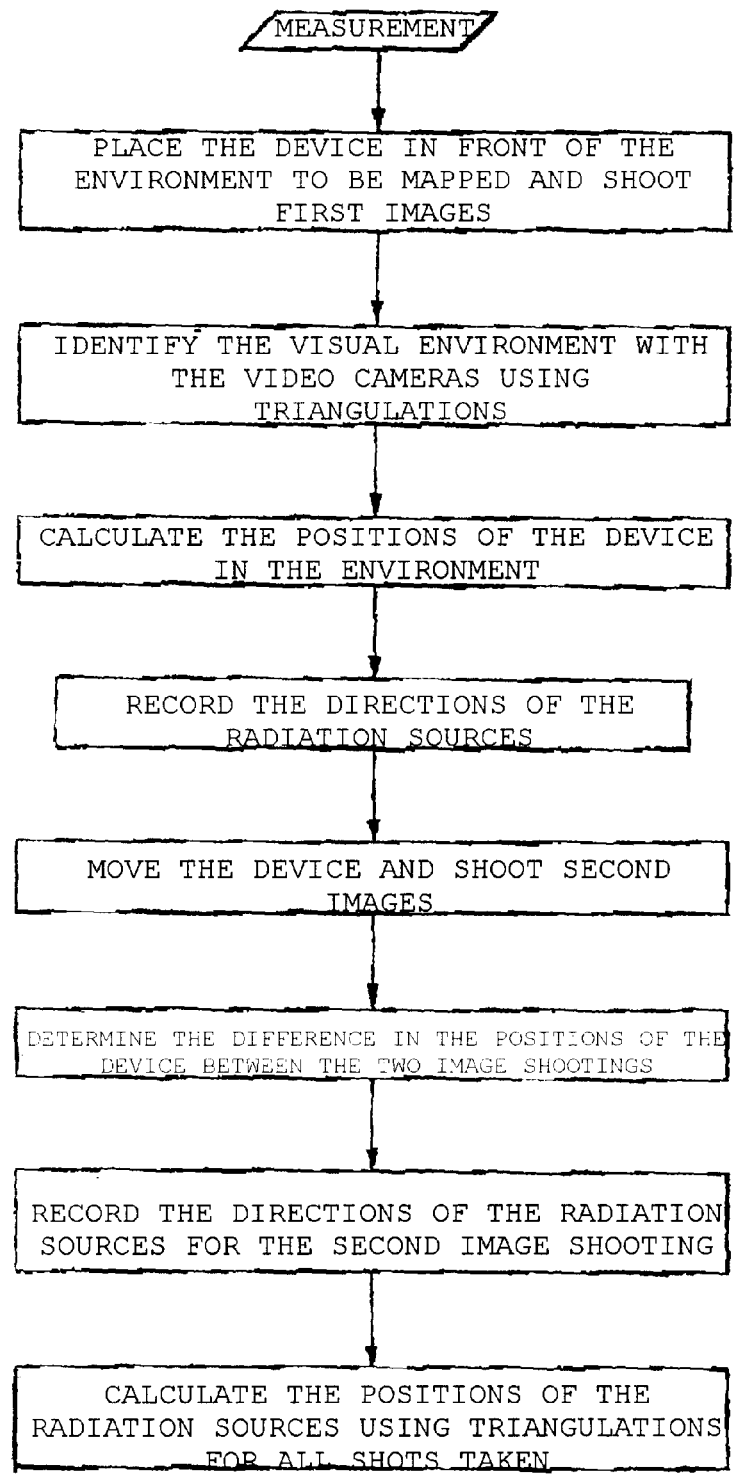
Figure 10:
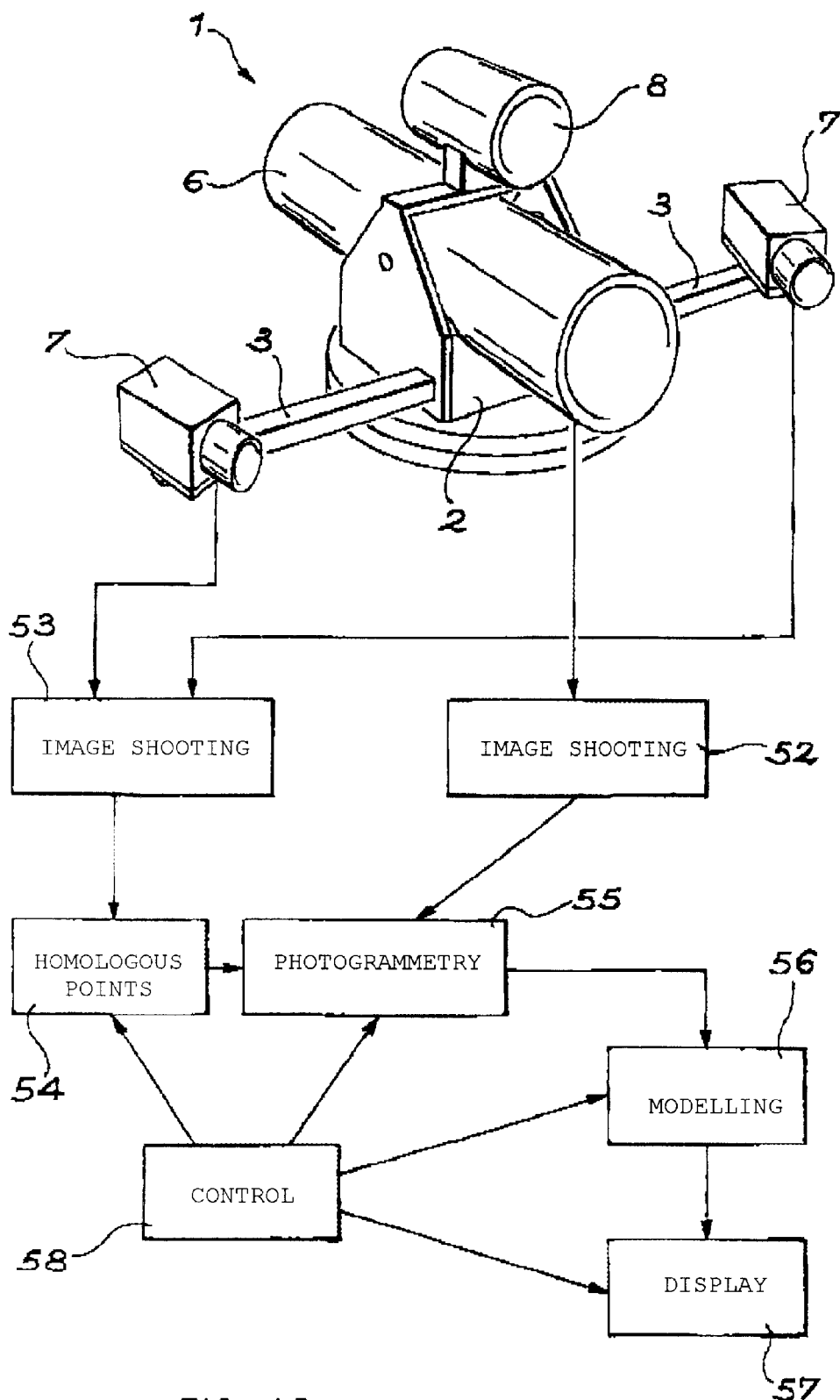
FIG. 10 is a diagram of the means, notably computer means, serving the device.

FIGS. 8 and 9 are flow diagrams which set out the steps undertaken in order to calibrate the device and then to use it for effecting a mapping. A complete diagram of the operating system of the device is finally given in FIG. 10: there is found therein a first shooting module 52 which is connected to the gamma camera 6 and which records its images; a second shooting module 53 connected to the video cameras 7 and which records their images; a module for seeking homologous points 54 which is connected to the second shooting module 53 and which seeks the homologous points, corresponding to one and the same point on the object sighted, present on the images of the two video cameras 7; a photogrammetry module 55 which establishes essentially the directions of the points of the object aimed at according to the positions of the images of these points on the views; a modelling module 56 which calculates the positions of the points on the object with respect to the device; a display module 57; and a control module 58 responsible for the running of the four previous modules, their relationships and the triggering of the shots. All these modules can in reality be grouped together on the same computer and be embodied in particular by a software package.

What is claimed is:

1. A method for mapping sources of radiation in a three-dimensional environment, comprising:

providing an assembly comprising a support, means for taking visual images, and means for taking images of the sources, said means for taking visual images and said means for taking images of the sources being secured together to the support;

determining relationships between respective positions and orientations of said means for taking visual images and said means for taking images of the sources;

taking at least two visual images of the environment at different angles of view with said assembly displaced at one imaging position and at least two images of the sources with said assembly displaced to at least two imaging positions;

establishing a three-dimensional model of the environment from said at least two visual images, identifying homologous elements in the at least two visual images, and then computing locations of said homologous elements;

determining lines of projection of the sources leading to the means for taking images of the sources for the at least two imaging positions;

locating said lines of projection in said three-dimensional model based on said relationships; and computing positions of intersection points of said lines of projection in said three-dimensional model, which are positions of the sources.

2. A method according to claim 1, wherein said three-dimensional model of the environment is established using measurements of translation and rotation displacements of said assembly between said at least two imaging positions.

3. A method according to claim 1, further comprising:

a preliminary calibration comprising correcting any distortion in images by establishing a look-up table between points on the images and directions of sight of a known object at a given position of said means for taking visual images and said means for taking images of the sources.

4. A method according to claim 1, further comprising:

a preliminary calibration comprising assessing positions of optical centers of said means for taking visual images and said means for taking images of the sources with respect to a known object and assessing directions of central axes of sight of said means for taking visual images and said means for taking images of the sources.

5. A method for mapping sources of radiation in a three-dimensional environment, comprising:

providing an assembly comprising a support, two means for taking visual images, and one means for taking images of the sources, said two means for taking visual images being oriented in directions such that they have at least a part of their field of vision in common, said two means for taking visual images and said one means for taking images of the sources being secured together to the support;

determining relationships between respective positions and orientations of said two means for taking visual images and said one means for taking images of the sources, and relationships between respective positions and orientations of said two means for taking visual images;

taking at least two visual images of the environment with each of said two means for taking visual images with said assembly displaced at least at two imaging positions and at least two images of the sources with said assembly displaced to the respective two imaging positions;

establishing three-dimensional models of the environment from said at least two visual images for each one of said two means for taking visual images, identifying homologous elements in the visual images, and then computing locations of said homologous elements for each of said imaging positions;

determining lines of projection of the sources leading to said one means for taking images of the sources for the respective two imaging positions;

locating in each three-dimensional model said lines of projection determined for a same imaging position by using said relationships;

combining the three-dimensional models into an overall model and locating said lines of projection in said overall model; and computing positions of intersection points of said lines of projection in said overall model, which are positions of the sources.

6. A method according to claim 5, wherein one of said two means for taking visual images is said means for taking images of the sources.

7. A method according to claim 5, wherein said overall model of the environment is established using measurements of translation and rotation displacements of said assembly between said imaging positions.

8. A method according to claim 5, further comprising:

a preliminary calibration comprising correcting any distortion in images by establishing a look-up table between points on the images and directions of sight of a known object at a given position of said two means for taking visual images and said one means for taking images of the sources.

9. A method according to claim 5, further comprising:

a preliminary calibration comprising assessing positions of optical centers of said two means for taking visual images and said one means for taking images of the sources with respect to a known object and assessing directions of central axes of sight of said two means for taking visual images and said one means for taking images of the sources.

* * * * *